United States Patent [19]

Murayama

[11] Patent Number: 4,473,251
[45] Date of Patent: Sep. 25, 1984

[54] MOTORCYCLE EQUIPPED WITH AUDIO DEVICES

[75] Inventor: Masato Murayama, Kawagoe, Japan

[73] Assignee: Honda Giken Kogyo Kabushiki Kaisha, Tokyo, Japan

[21] Appl. No.: 419,536

[22] Filed: Sep. 17, 1982

[30] Foreign Application Priority Data

| Sep. 19, 1981 | [JP] | Japan | 56-148256 |
| Sep. 19, 1981 | [JP] | Japan | 56-148262 |
| Mar. 25, 1982 | [JP] | Japan | 57-42173[U] |
| Mar. 25, 1982 | [JP] | Japan | 57-42174[U] |
| Mar. 25, 1982 | [JP] | Japan | 57-42175[U] |
| Mar. 25, 1982 | [JP] | Japan | 57-42180[U] |

[51] Int. Cl.³ .................................. B62J 17/04
[52] U.S. Cl. ........................ 296/78.1; 280/289 S; 340/134
[58] Field of Search ............... 296/78.1; 280/289 R, 280/289 S; 180/219; 340/134, 135; 181/141

[56] References Cited

U.S. PATENT DOCUMENTS 4,278,285  7/1981  Cummings et al. ............... 296/78.1
4,379,584  11/1983  Willey ............................. 296/289 S Primary Examiner—Robert R. Song
Attorney, Agent, or Firm—Birch, Stewart, Kolasch & Birch

[57] ABSTRACT

A motorcycle equipped with audio equipments on the front cowl thereof, which equipments contains various parts such as electric circuit parts, manually operable parts, sound producing parts etc. and arranged so as to maintain balance in weight in the lateral direction of the motorcycle while maintaining facilitated operability and characteristics of the audio equipments.

14 Claims, 13 Drawing Figures

MOTORCYCLE EQUIPPED WITH AUDIO DEVICES

BACKGROUND OF THE INVENTION

The present invention related to an arrangement containing electric equipments, such as audio devices, mounted on a vehicle, especially on a motorcycle.

In recent years, motorcycles are equipped with various electric devices such as a transceiver, a radio receiver, or a cassette receiver.

In installing such devices, it is necessary to keep high operability of those devices without impairing the robustness and the drivability of the motorcycle per se.

In addition, it is desirable to obtain high quality of characteristics of the audio devices even on the motorcycle.

SUMMARY OF THE INVENTION

An object of the present invention is therefore to provide an improved arrangement on a motorcycle containing audio equipments which provide a good balance in weight for the motorcycle.

Another object of the present invention is to provide an improved arrangement on a motorcycle containing audio equipments which can be readily operable by the rider.

A further object of the present invention is to provide an improved arrangement on a motorcycle containing audio equipments which have good quality of characteristics.

The foregoing and other objects and advantages of the present invention will become more clearly understood upon review of the following description taken in conjunction with the accompanying drawings.

BRIEF DESCRIPTION OF THE DRAWINGS

In the drawings in which like reference numerals denote like parts.

DETAILED DESCRIPTION OF PREFERRED EMBODIMENTS

Figure 1:
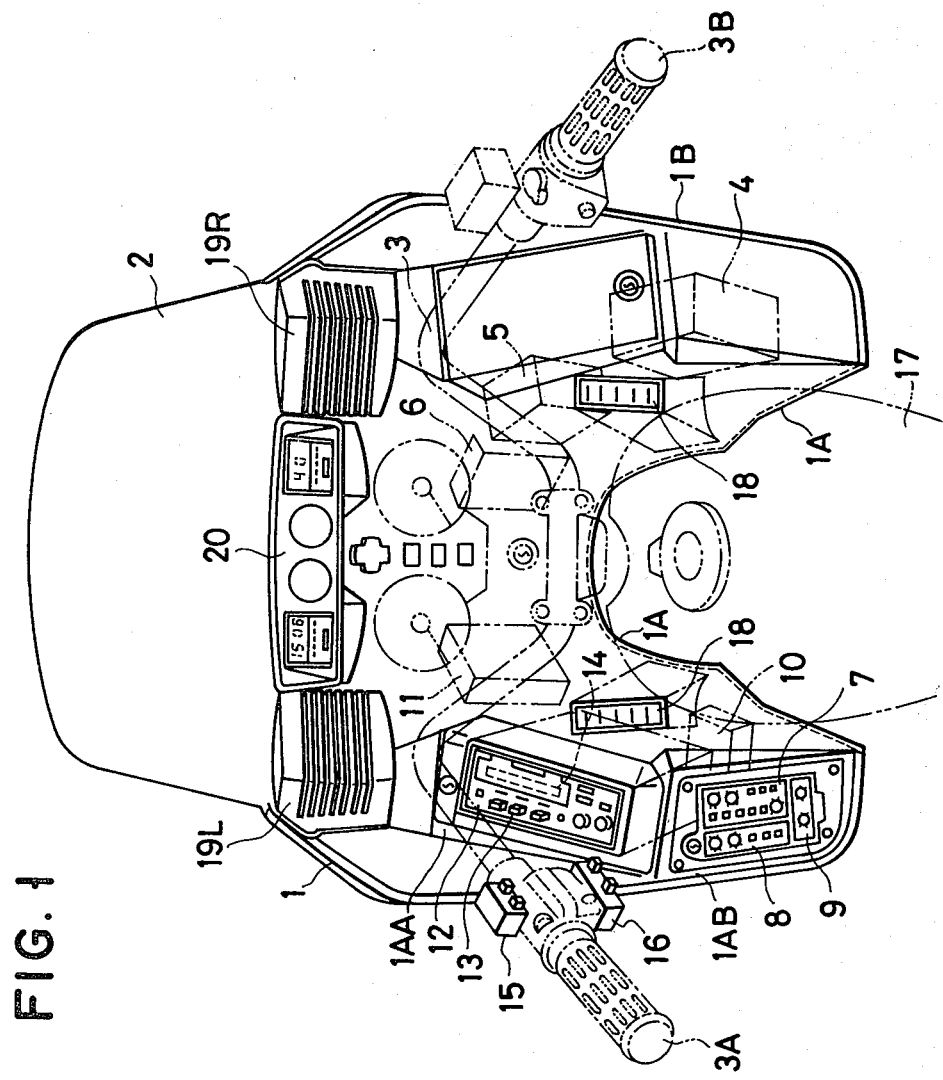
FIG. 1 is a general view of an arrangement of a front cowl of a motorcycle on which various audio devices mounted according to the present invention.
Figure 2:
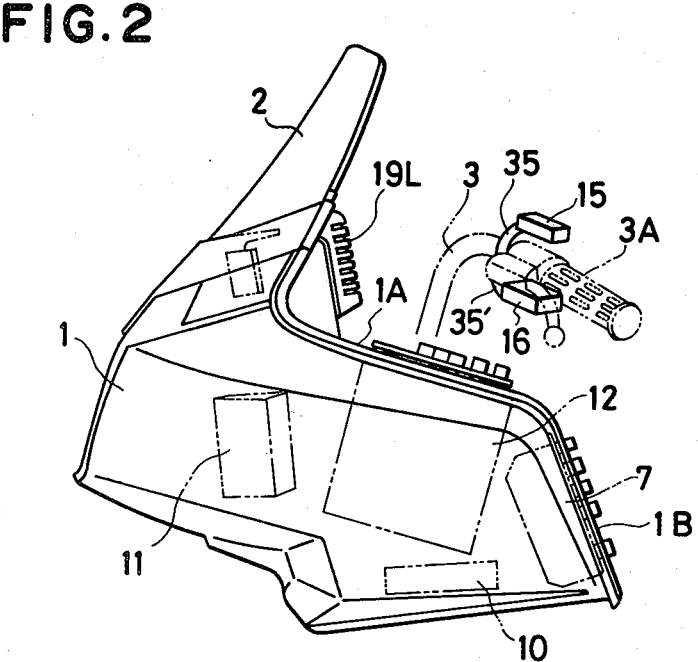
FIG. 2 is a side view showing a lefthand side of the arrangement shown in FIG. 1.
Figure 3:
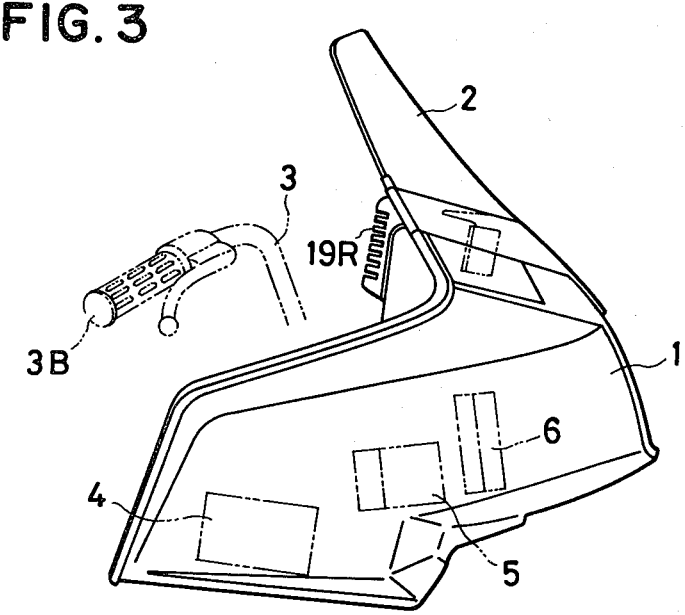
FIG. 3 is a side view similar to FIG. 2, showing a righthand side of the arrangement shown in FIG. 1.

Reference is first made to FIGS. 1 through 3 in which an example of an arrangement of electric equipment on a front cowl of a motorcycle is illustrated.

FIG. 1 through 3 generally illustrate an arrangement according to the present invention, which includes a front cowl 1 attached to a body of the motorcycle and made of an inner panel 1A and an outer panel 1B which are integral with each other. A steering handle 3 is provided which may be movable independently of the front cowl 1. The inner panel 1A is integrally connected to the inner wall of the outer panel 1B so as to define an arcuated hollow chamber or space extending along the inner wall of the outer panel 1B. The inner panel 1A has a generally U-shaped cross section in a horizontal plane and its leg portions extend rearwardly of the motorcycle and are formed into a pair of inwardly protruded and arcuated portions respectively forming left-hand and right-hand hollow spaces near and beneath left-hand and right-hand grips 3A and 3B together with the lower portions of the outer panel 1B. Within the right-hand side chamber, various electric circuit parts of the electric equipment are disposed, such as a radio main unit 4, a transceiver main unit 5 and a power amplifier unit 6.

Within the left-hand side chambers are installed various control units such as a radio control unit 7, a transceiver control unit 8, and intercom control unit 9, an antenna distributor unit 10, a multi-changer unit 11 and a cassette tape player unit 12. It is to be understood that the manually operable parts such as buttons and dials of the control units are favourably positioned near and beneath of the left-hand grip 3A, thereby performing facilitated handling of the manually operable parts.

It is to be understood that the above-mentioned electric circuit parts and the various control units are respectively disposed within the right-hand and left-hand side chambers of the front cowl while preferably performing balance in weight in the lateral direction of the motorcycle.

As seen from FIG. 1, each leg portion of the inner panel 1A has a gradually inclined portion 1AA gradually inclined downwardly from the front part thereof in the rearward direction and a steeply inclined portion 1AB being continuous to the portion 1AA and rearwardly downwardly inclined more steeply than the portion 1AA thereby forming the rear end of the panel 1A. The two inclined portions 1AA and 1AB respectively have apertures through which the manually operable parts of the cassette tape player 12 and the control units 7 through 9 are exposed to the outside along the upper surfaces of the inclined portions 1AA and 1AB. Furthermore, the manually operable parts of the control units 7 through 9 are downwardly inclined toward the center of the motorcycle, thereby providing facilitated handling by the rider of the motorcycle.

As illustrated in FIG. 1, control switches such as a radio select switch 15 and and a transceiver talk switch 16 are fixed on the handle 3 adjacent to the grip 3A. The motorcycle includes a fuel tank 17. A pair of air duct openings 18 allowing air to pass therethrough and a meter console 20 having various indicators indicating various operational conditions of the electric equipments which are mounted to the front cowl 1.

The switches 15 and 16 are preferably connected to the steering handle 3 through fastening means 35 at positions close to the left-hand grip 3A.

As being well known in the art, the electric parts excluding manually operable parts usually produces much more heat than the manually operable parts. Thus, the circuit parts and the control units excluding the manually operable parts are preferably positioned close to the air duct openings 18 thereby effectively performing radiation of the heat generated in those parts. The meter console indicating means 20, is on the other hand, positioned around the center of the front cowl 1 and near the screen 2 so as to enable the driver to easily observe the console 20.

As illustrated in FIGS. 1 through 3, left speaker 19L and right speaker 19R together with the windscreen 2 are connected to the front cowl 1.

As shown in FIG. 1, the cassette tape player unit 12 is detachably installed in the front cowl 1 by means of a suitable installing device which will be explained in detail hereinafter. Furthermore, an eject button 13 is disposed at the outer side of the body in relationship to a cassette ejection slot 14. With this arrangement the handling of a cassette tape is greatly facilitated. More specifically, when an operator, that is the rider of the motorcycle, presses the eject button 13 by the middle finger of the left-hand, the cassette tape ejected from the slot 14 is automatically receiver in the palm of the left-hand, thus preventing mishandling.

Figure 4:
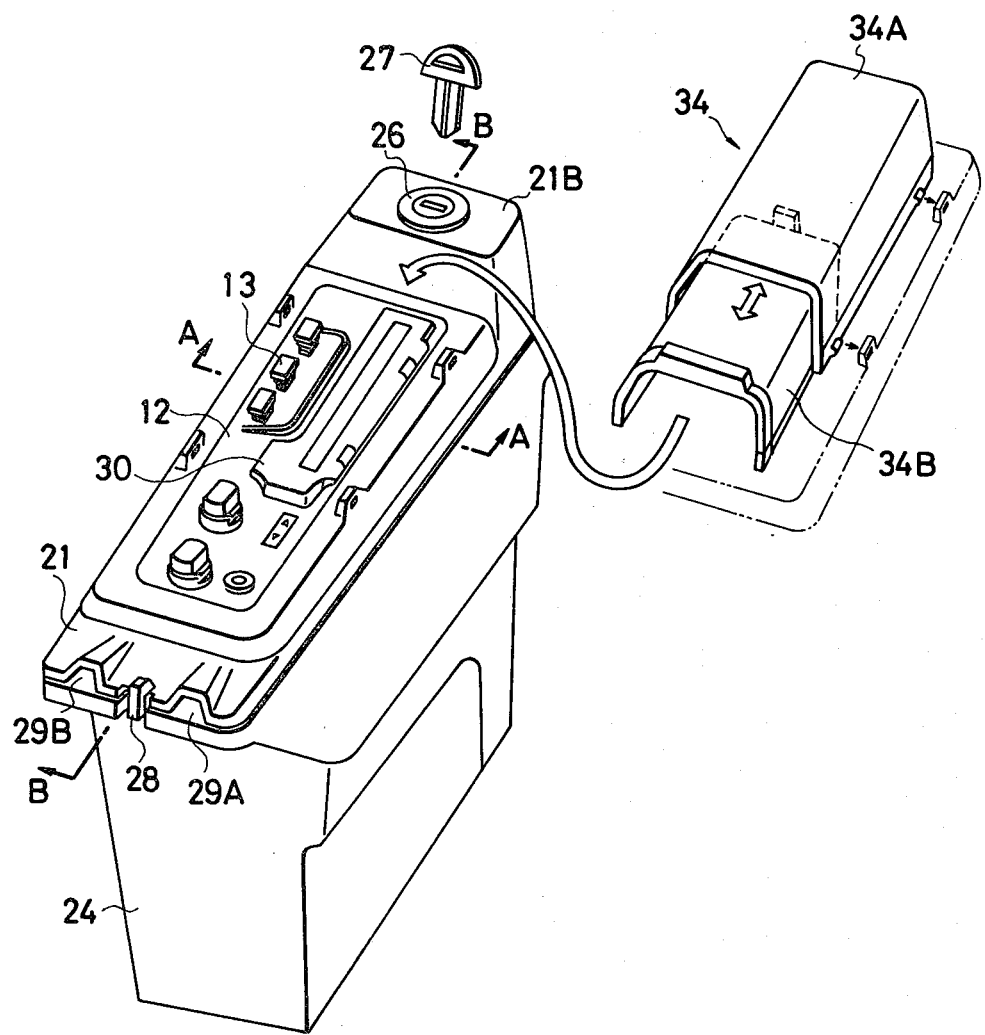
FIG. 4 is a general perspective view of a part of the audio devices according to the present invention, used for installing a cassette tape player unit.
Figure 5:
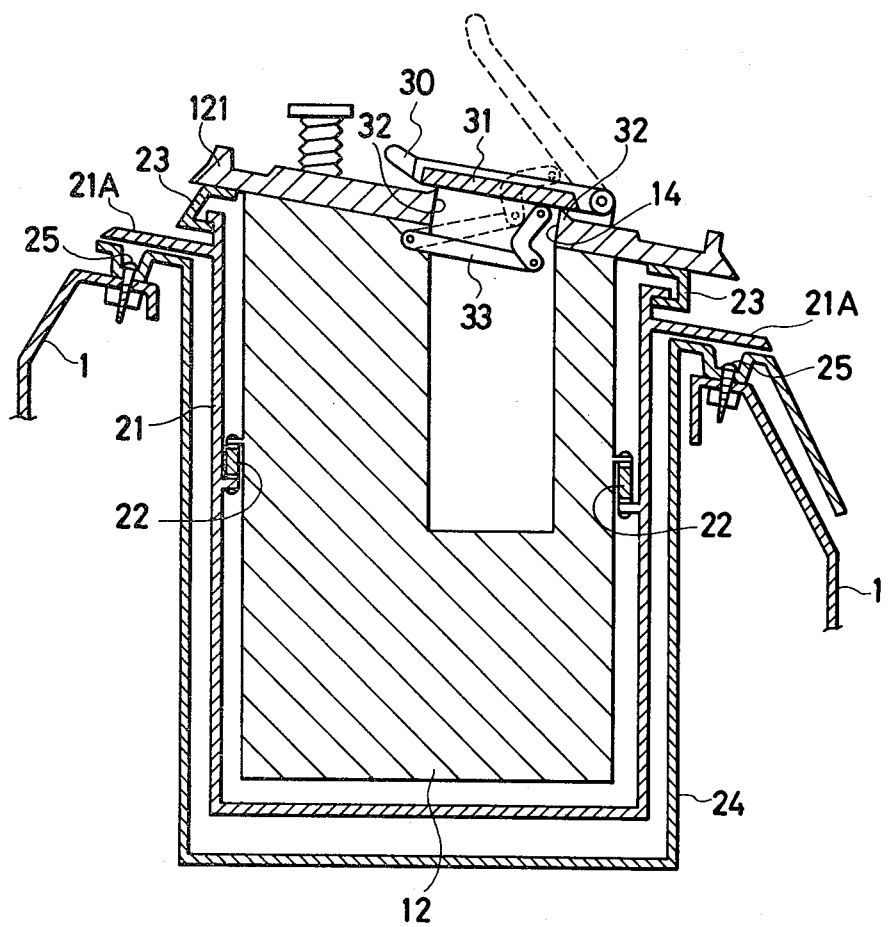
FIG. 5 is a vertical cross-sectional view taken along a plane of lines A—A of FIG. 4 showing the general structure of the part.
Figure 6:
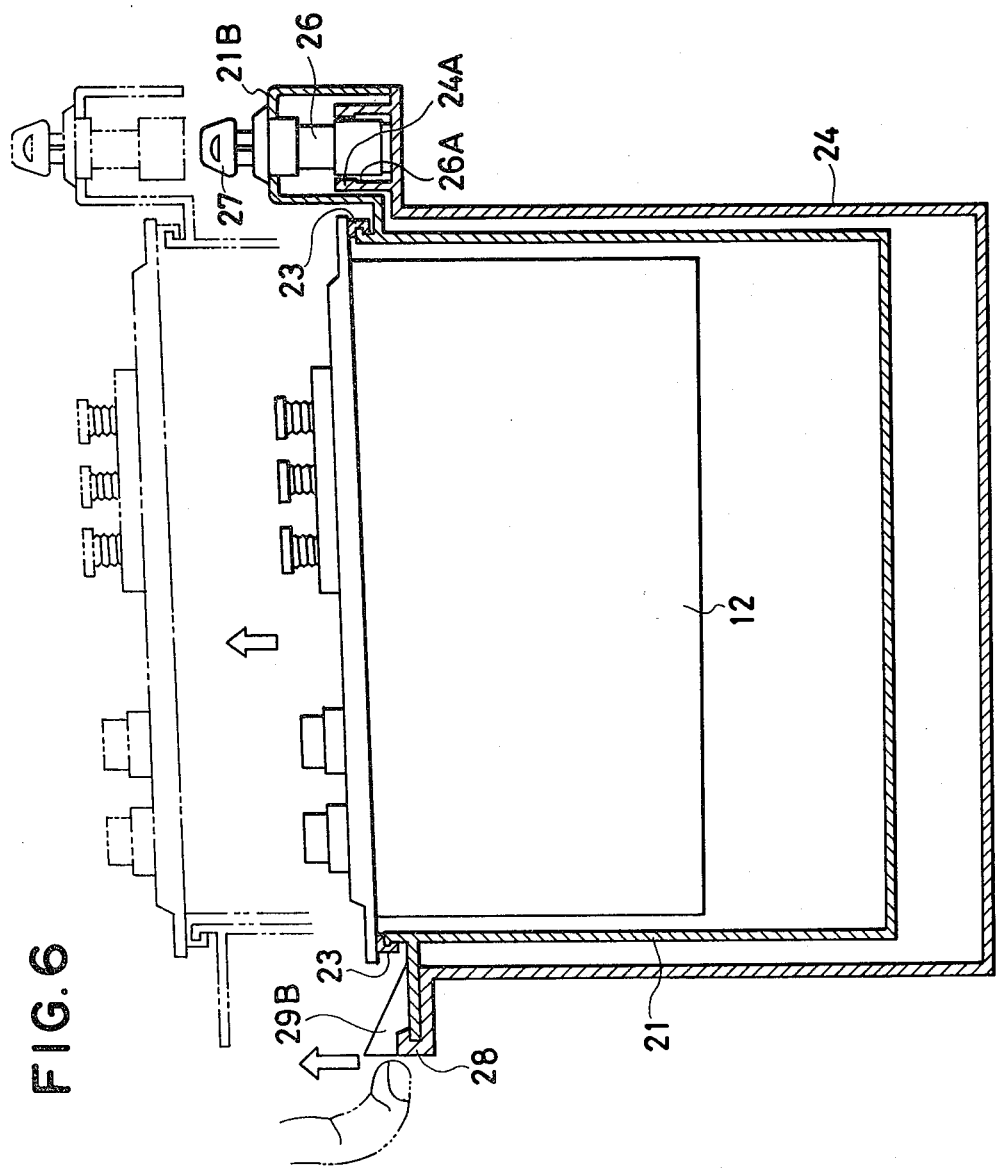
FIG. 6 is a vertical cross-sectional view similar to FIG. 5, taken along a plane of line B—B of FIG. 4, showing the states in which the cassette tape player unit is placed and withdrawn respectively.

Turning to FIGS. 4 through 6, the installing device for the cassette tape player in the front cowl 1 will be explained hereinafter in more detail.

As shown in the figures, the installing device comprises an inner case 21 which receives the cassette tape player unit 12 and an outer case 24 which is connected to the front cowl 1 by means of a plurality of screws 25.

The cassette tape player unit 12 is supported in the inner case 21 via a pair of rubber supports 22 so as to insulate the vibration from an engine of the motorcycle through the inner case 21.

A seal rubber 23 is disposed between a panel 121 of the cassette tape player unit 12 and a peripheral edge of the inner case 21 so as to prevent water from permeating into the interior of the inner case 21.

Furthermore, the inner case 21 is provided with a flange 21A which conceals the head portion of the screw 25 (see FIG. 5).

In this example, a lid 30, pivotally connected to the panel 121, is used for covering the cassette ejection slot 14. A seal rubber 31 is provided on the inner face of the lid 30 so as to cooperate with a projection 32 formed at the peripheral portion of the cassette ejection slot on the panel 121 to prevent water penetration. A link mechanism 33 is provided for retaining the lid 30 in desired positions.

In addition, a cover assembly 34 comprising an outer member 34A is connectable to the panel 121 of the cassette tape player 12. An inner member 34B, slidably received in the outer member 34A, is preferably provided on the cassette tape player unit so as to cover the control buttons on the panel 121.

In order to fix the inner case 21 to the outer case 24, a clamp 28 and a lock means 26 are provided. The clamp 28 and the lock means 26 will be explained with reference to FIGS. 4 and 6.

As shown in FIG. 4, the outer case 24 is provided with the clamp 28 for fixing the inner case 21 at the rear end thereof, i.e., the lower end of the top face. Also, the lock means 26 is provided to the front end portion 21B of the inner case 21, i.e., the upper end of the top face.

As shown in FIG. 6, the lock means 26 comprises a key cylinder assembly having a lock member 26A rotatable by a key 27. At a position on the outer case corresponding to the lock member 26A of the lock means, there is provided a hook 24A engageable therewith.

When the inner case 21 is placed in the outer case 24, the lock member 26A is automatically engaged with the hook 24A due to the slope formed on the side face thereof. The lock member 26A can be disengaged from the hook by turning the key 27.

As shown in FIG. 4, at the rear end of the flange portion 21A of the inner case 21, there is provided a pair of generally cone-shaped bending portions 29A and 29B so that the inner case 21 can be lifted by the fingertips of an individual when the cassette tape player unit 12 is to be removed from the front cowl 1.

Figure 7:
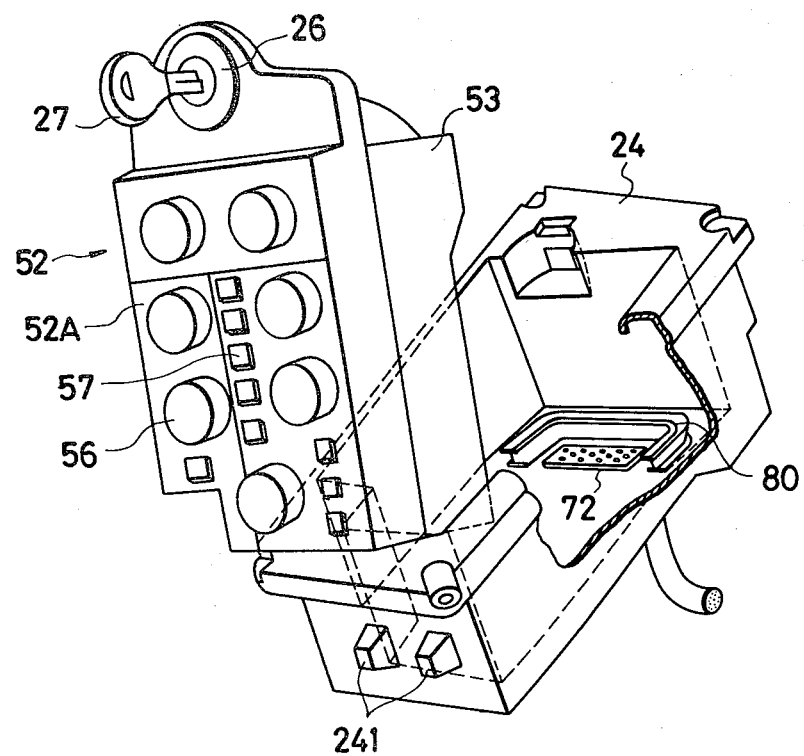
FIG. 7 is a general perspective view of another part of the audio devices in the arrangements according to the present invention, for installing an audio control unit, showing a state in which the audio control unit is withdrawn.
Figure 8:
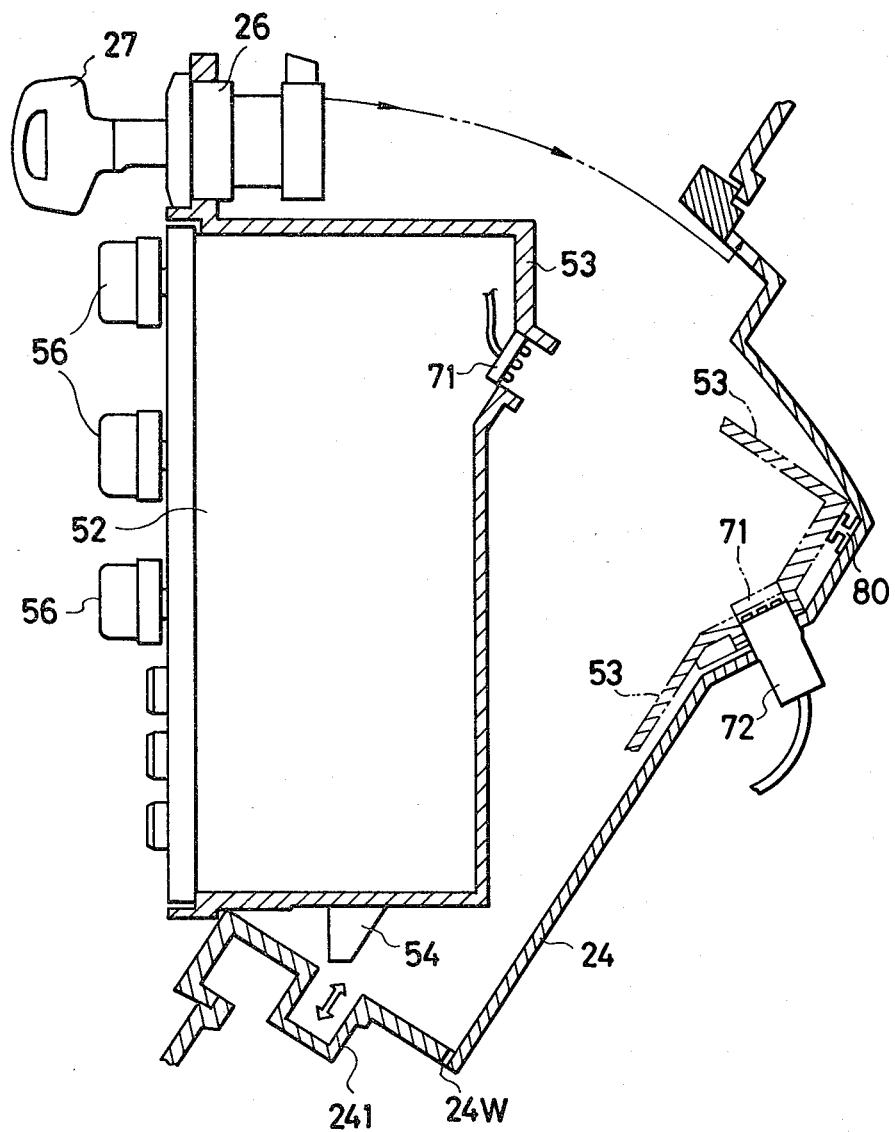
FIG. 8 is a vertical cross-sectional view of the part, corresponding to FIG. 7.

Reference is now made to FIGS. 7 and 8, another installing device will be explained.

In this installing device, an audio control unit 52 which may correspond to the control units 7, 8 and 9 is received in the outer case 24 and the inner case 21 which is used in the first installing device is eliminated. The second installing device features a pair of electric connector members provided on a case 53 of the audio control unit and provided on the outer case 24. The case 53 is connected to the outer case 24 in a similar manner as in the first installing device of FIGS. 5 and 6. However, instead of the engagement between the clamp 28 and the flange 21A in the first installing device, a pair of protrusions 54 formed on the rear end of the case 53 and a pair of recesses 241 formed on the corresponding portion of the outer case 24 are utilized to fix the case 53 and the outer case 24 together. Similarly, a lock member 26A of the lock means 26 is received in an opening 242 formed on the outer case 24 instead of the hook 24A in the first installing device (see FIG. 8).

The electric connector members comprise a first connector member 71 fixed to the bottom of the case 53 and a second connector member 72 fixed to the bottom of the outer case 24. Each connector member 71, 72 is positioned on the case 53 and the outer case so as to be facing each other. In this manner, the electric connection between the first and second connector members 71 and 72 is automatically made when the case 53 is received in the outer case 24.

In order to prevent water from flowing into the connector members 71 and 72, a seal member 80 made of rubber, for example, is provided on the bottom of the outer case 24 in a manner such that the seal member 80 surrounds the second connector member 72 except at the lower side end thereof so as to easily permit discharge of the water (see FIG. 8). Water may be discharged from the outer case 24 though the opening 24W.

The thickness of the seal member 80 is determined slightly larger than the gap between the case 53 and the outer case 24 so as to assure the sealing function and also to operate as a shock absorbing device between the case 53 and the outer case 24.

Since the case 53 of the audio control unit 52 and the outer case 24 are usually disposed in a manner which is inclined to the rear of the motorcycle, the arrangement of the seal member 80 shown in FIG. 8 is quite advantageous to prevent water from flowing into the portion in which the connector member 72 is fixed.

Figure 9:
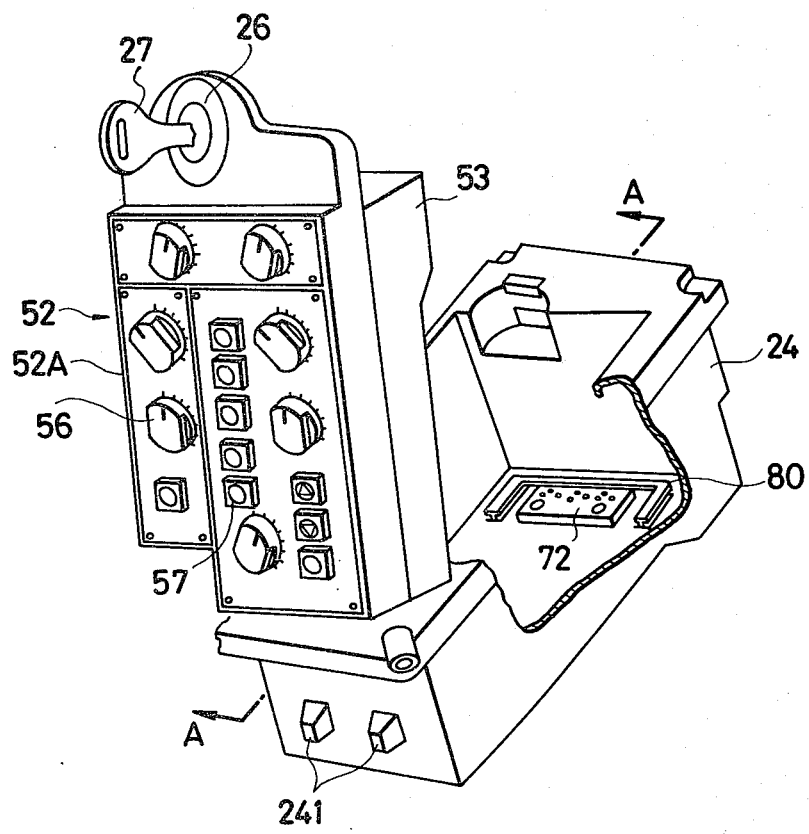
FIG. 9 is a general perspective view of a modification of the part shown in FIG. 7 which contains an audio control unit, showing a state in which the audio control unit is withdrawn.
Figure 10:
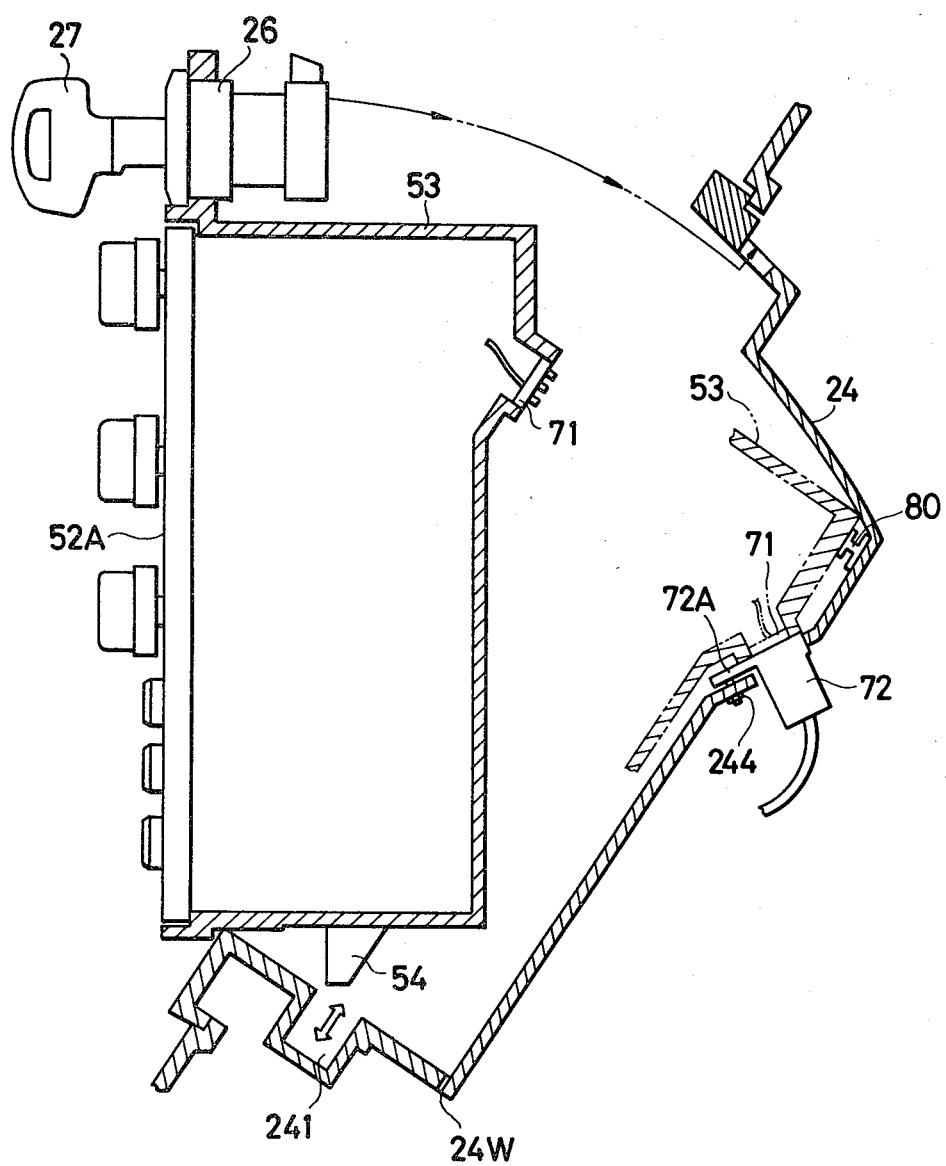
FIG. 10 is a vertical cross-sectional view of the part, corresponding to FIG. 9.

Turning to FIGS. 9 and 10, a modification of the installing device of FIGS. 7 and 8 will be explained hereinbelow.

As shown in FIGS. 9 and 10, this modification has a similar construction as the device shown in FIGS. 7 and 8, except that the second connector member 72 is slidably disposed on the bottom of the outer case 24.

Since the second connector member 72 is slidably mounted on the outer case 24, the position thereof is automatically adjusted to the position of the first connector member fixed to the case 53. Thus, when the case 53 is received in the outer case 24 the connection between the first and second connector members 71 and 72 is facilitated.

As will be readily understood from the foregoing, a device for installing electronic equipment on a vehicle, having sufficient waterproof and vibration insulation functions is provided according to the present invention.

Especially, the electronic equipment is readily disconnected from the body of the motorcycle by using a pair of electric connector members respectively connected to the case of the electronic equipment and the outer case fixed to the body of the motorcycle. Moreover, the electronic equipment is protected from burglary by the provision of the lock means which is only accessible by means of a key.

In addition, beacause of the water tight structure of the lid which covers the cassette ejection slot, and a cover assembly for the control panel, use of the cassette tape player is made possible even in the rain.

Turning back to FIGS. 7 through 10, it can be seen that the audio control unit 52 contains a control panel or part 52A in which various manually operable knobs and/or buttons such as a plurality of dial knobs 56 and push buttons 57 are provided. In this instance, it is to be understood that the push buttons 57 are disposed the center of the control panel 52A and the dial knobs 56 are positioned near the edge portions of the panel 52A thereby to surround the push buttons 57. With this specific arrangement of the buttons and knobs, the buttons can be easily pushed by one or more fingers of the rider or operator and also the dial knobs 56 can be readily rotated by the fingers of the rider without unwanted incorrect operation.

Figure 11:
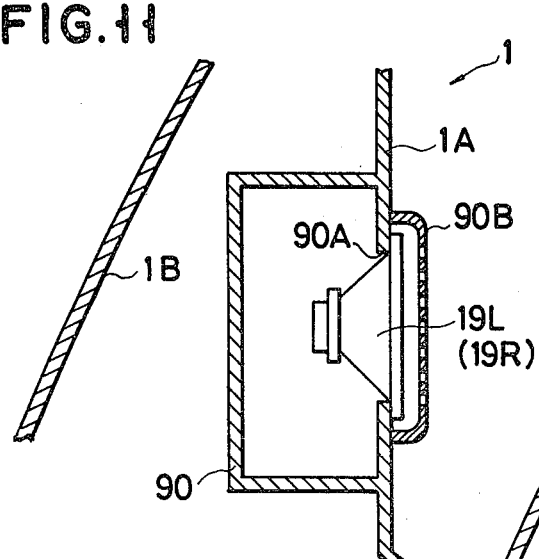
FIG. 11 and 12 are sectional views of a part of the front cowl to which a speaker is mounted.

Referring now to FIG. 11, a preferred arrangement according to the present invention is shown in which a part of the inner panel 1A of the front cowl 1 is formed into a speaker cabinet 90 for the speaker 19L or 19R. As seen from this figure, the speaker 19L or 19R is coupled into an aperture 90A formed in the speaker cabinet 90. A cover 90B is provided in front of the speaker 19L or 19R. With this arrangement, the speaker 19L and 19R are fixedly mounted on the front cowl 1 without necessity of any specific speaker cabinet. Furthermore, since the speaker cabinet 90 is integral with the front cowl 1, the speaker 19L and 19R are stably and firmly mounted on the front cowl 1 without any specific fastening means even when subjected to shocks and vibrations via the front cowl 1.

Figure 12:
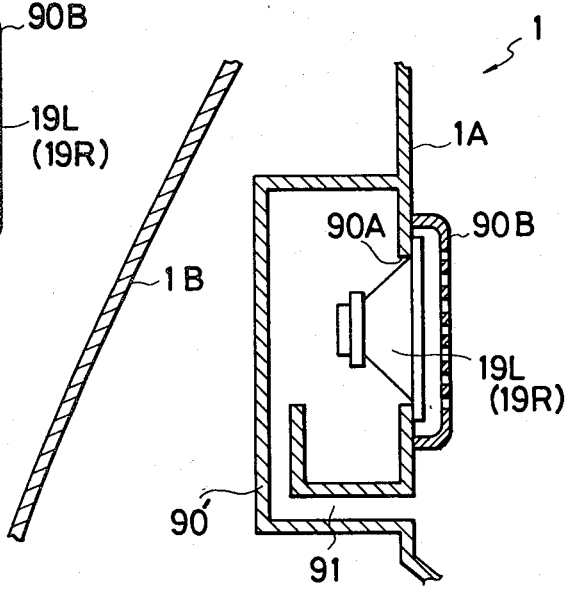

FIG. 12 shows a modification of the speaker cabinet 90 shown in FIG. 11 and generally designated by a reference numeral 90'. The cabinet 90' has the same construction as that of FIG. 11 except that a duct 91 formed therein which duct is effective for conveying the low frequency components emitted from the rear surface of the speaker 19L or 19R to the outside so that the cabinet 90' functions as a bass-reflex cabinet.

Figure 13:
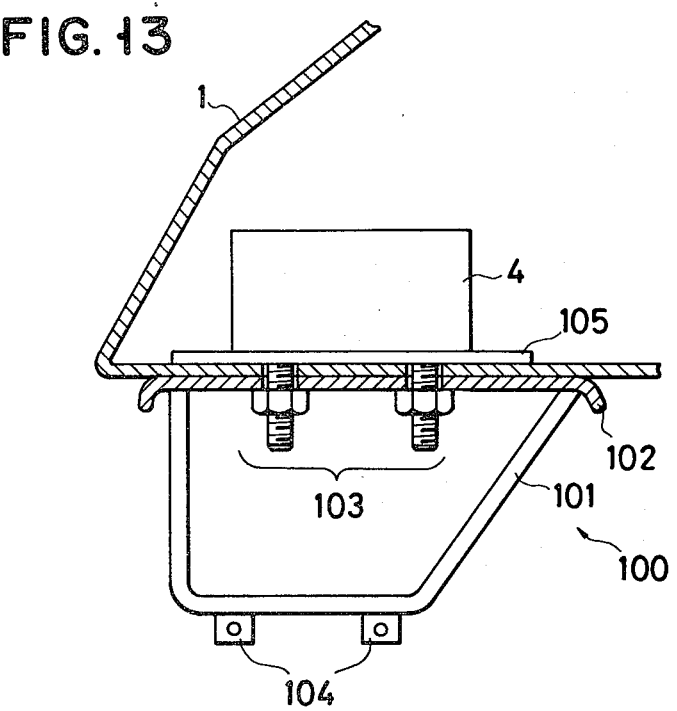
FIG. 13 is a sectional view of a part of the front cowl to which the front cowl is connected to the body of the motorcycle.

FIG. 13 shows a preferred arrangement according to the present invention in which a front cowl 1 is connected to the body (not shown) of the motorcycle by means of a fastening assembly 100. The fastening assembly 100 includes a generally U-shaped frame 101, and a support plate 102 mounted on both ends of the leg portions of the frame 101 for supporting the front cowl 1. The support plate 102 is connected to a bottom portion of the front cowl 1 by means of fastening assembly 103 constituted, for example, by a pair of bolt and nut assemblies. The frame 101 is, on the other hand, connected to the body of the motorcycle by way of terminals 104 formed thereon.

It is to be noted that a relatively heavy part of the audio equipments such as the radio main unit 4 is mounted via a support member 105 onto the portion of the front cowl 1 at which the front cowl 1 is connected to the body of the motorcycle via the fastening assembly 100. With this arrangement, the front cowl 1 can bear such relatively heavy part with sufficient strength due to the support of the fastening assembly 100.

Above, preferred embodiments of the present invention have been described. It should be understood, however, that the foregoing description is for illustrating purpose only, and is not intended to limit the scope of the invention. Rather, there are numerous equivalents to the preferred embodiments, and such are intended to be covered by the appended claims.

What is claimed is:

1. In a motorcycle having a body and a steering handle movably connected to said body, the improvement which comprises:
   a front cowl mounted on said body and around said steering handle; and
   an audio equipment mounted on said front cowl, said audio equipment including at least one manually operable part which is placed at either one side of said front cowl.

2. The improvement as defined in claim 1, said audio equipment containing at least two parts respectively positioned at both side portions of said front cowl so as to perform balance in weight in the lateral direction of the motorcycle.

3. The improvement as defined in claim 1, in which said front cowl having therein a hollow space and said audio equipment is placed within said hollow space.

4. The improvement as defined in claim 1, 2 or 3 in which said front cowl includes at least one air duct through which air passes and in which said audio equipment includes at least one heat generating circuit part positioned close to said air duct.

5. The improvement as defined in claim 1, in which said audio equipment includes at least one relatively heavy part mounted on a portion of said front cowl, at which portion said front cowl is mounted on the body.

6. The improvement as defined in claim 1, in which said audio equipment includes at least one control switch which is mounted on the steering handle at a position close to the grip of the steering handle.

7. The improvement as defined in claim 3, said hollow space locates beneath the steering handle, and an upper wall portion of said front cowl forming said hollow space thereunder includes at least two inclined portions aligned along the body and continuous to each other, said inclined portions having downward inclinations in the rearward direction and the inclination of the rearward inclined portion being steeper than the forward inclined portion, and said audio equipments includes two different manually operable parts positioned within apertures respectively formed at said inclined portions.

8. The improvement as defined in claim 1, in which said manually operable part is so placed that the lower portion thereof locates nearer to the body than the upper portion thereof.

9. The improvement as defined in claim 1, in which said manually operable part includes at least one push button and a plurality of dial knobs surrounding said push button.

10. The improvement as defined in claim 1, in which said audio equipment include at least one indicating means which is placed around the center of said front cowl.

11. The improvement as defined in claim 1, in which said audio equipments include at least one speaker which is supported on a portion of said front cowl, said portion enclosing at least the rear portion of said speaker so as to act as a speaker cabinet.

12. The improvement as defined in claim 11, in which said portion of the front cowl includes a bass-reflex cabinet construction for the speaker.

13. In a motorcycle having a body and a steering handle movably connected to said body, the improvement which comprises:
   a front cowl mounted on said body and around said steering handle; and
   an audio equipment mounted on said front cowl, said audio equipment including at least one manually operable part which is placed at either one side of said front cowl and near and beneath of the grip of said steering handle.

14. In a motorcycle having a body and a steering handle movably connected to said body, the improvement which comprises:
   a front cowl mounted on said body and around said steering handle;
   an audio equipment mounted on said front cowl, said audio equipment including at least one manually operable part which is placed at either one side of said front cowl; and
   a pair of speakers respectively mounted on said front cowl generally along the lateral direction of the motorcycle.

* * * * *